INVENTORS
WILLARD A. RAMSEY
CHARLES E. BOLDING

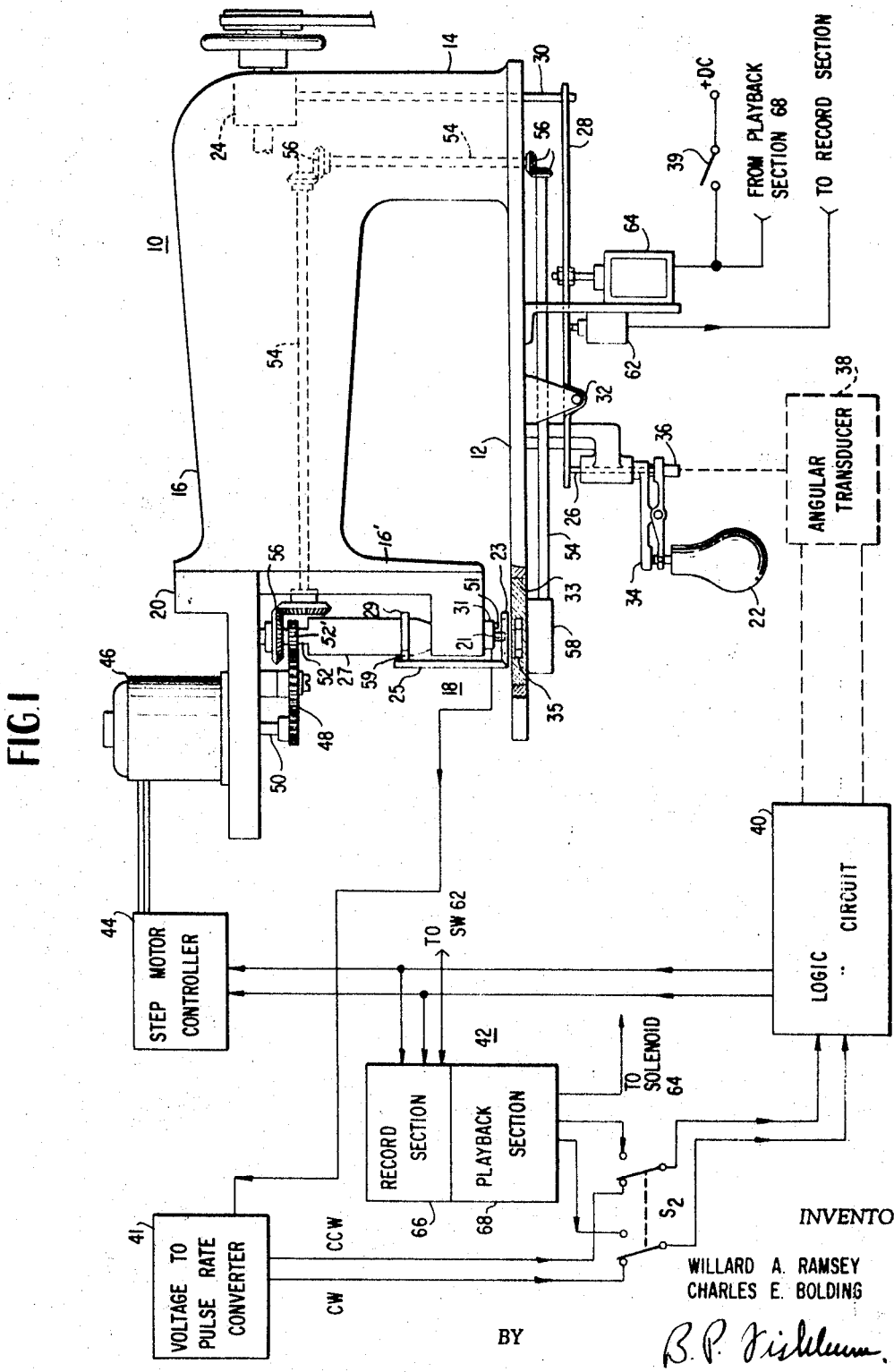

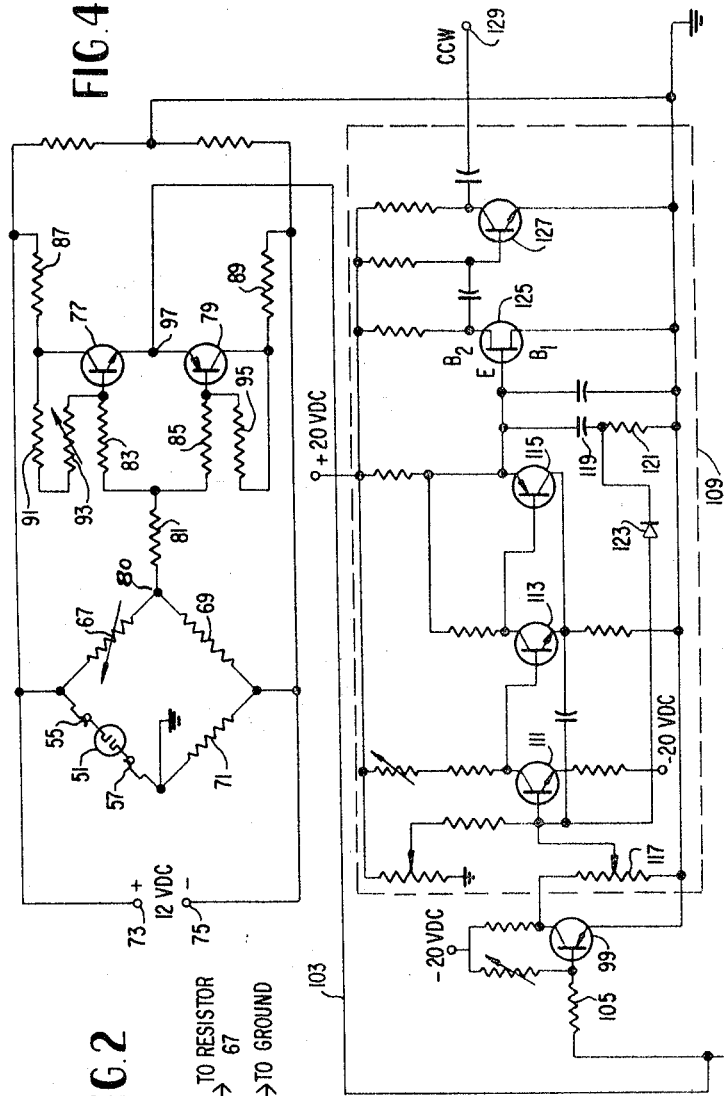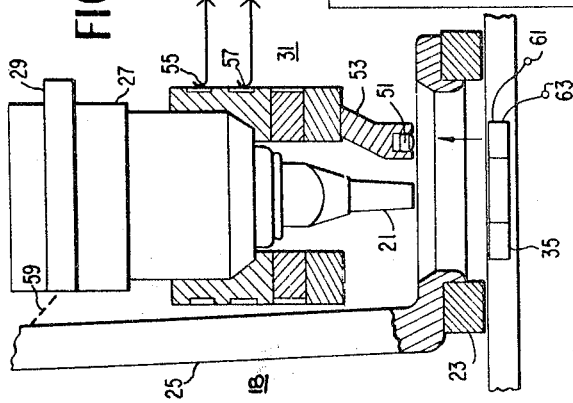

BY B. P. Fishburn Jr.
ATTORNEY

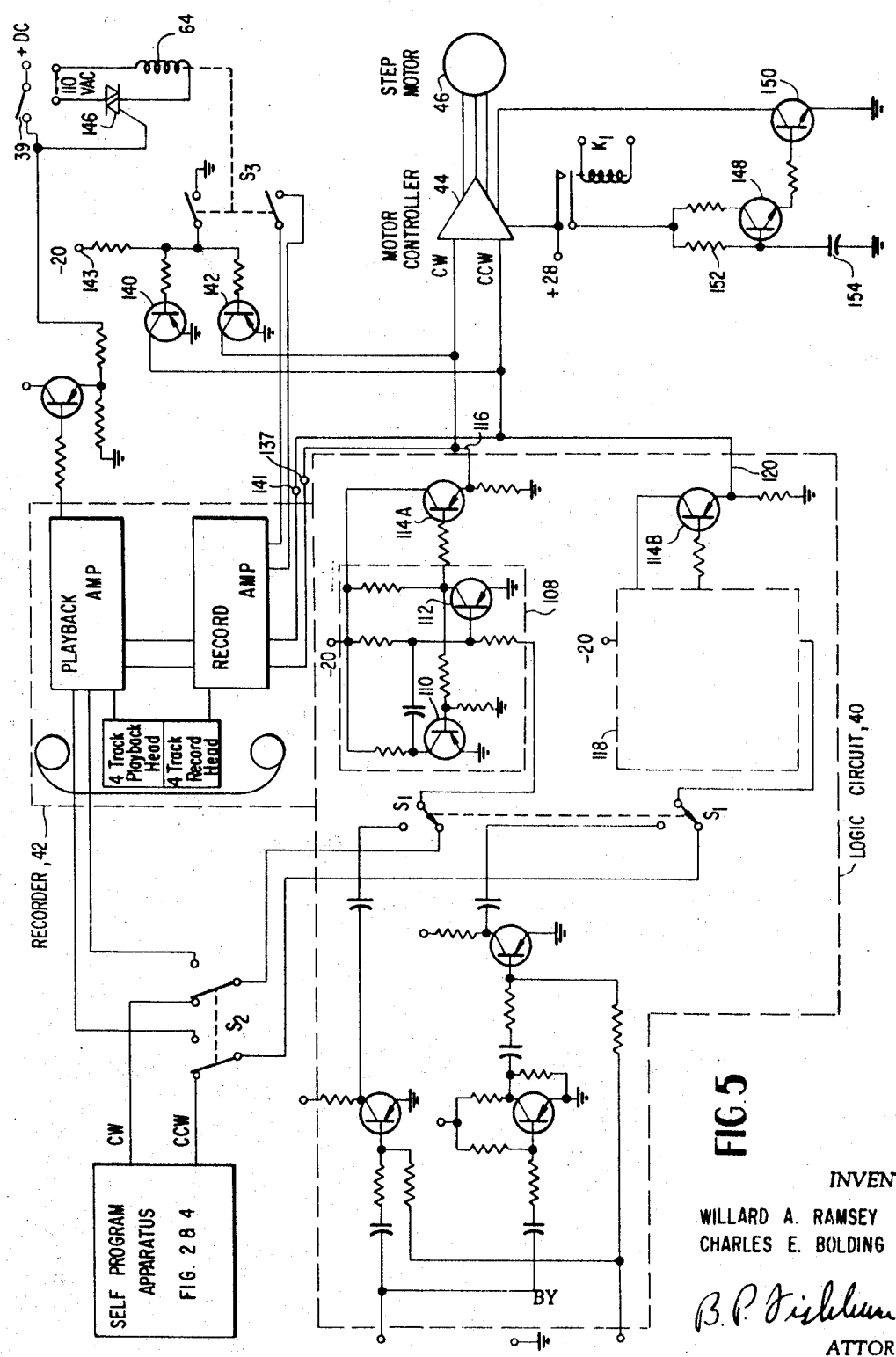

United States Patent Office 3,459,145
Patented Aug. 5, 1969

3,459,145
SELF-PROGRAMMED AUTOMATIC EMBROIDERY SYSTEM
Willard A. Ramsey, Greenville, and Charles E. Bolding, Liberty, S.C., assignors to Her Majesty Industries, Inc., Mauldin, S.C., a corporation of South Carolina
Filed Dec. 27, 1966, Ser. No. 605,066
Int. Cl. D05b 23/00; D05c 3/02
U.S. Cl. 112—121.11                                 10 Claims

ABSTRACT OF THE DISCLOSURE

An automatic system utilizing a Cornely-type of embroidery sewing machine including means to detect the edge of a workpiece or a heavy line drawn thereon and stitch around the edge of the workpiece or along the heavy line drawing exclusive of any external control. A photosensitive read head is located in the vicinity of the sewing head including a reciprocating needle. The read head is adapted to rotate around the needle axis corresponding to the direction of feed so that as the direction of feeding changes, the read head is rotated accordingly. The output of the read head is converted into a pulse signal which is fed to an electrical step motor which drives a workpiece orientation feed guide means in a step-by-step manner either in a clockwise or counterclockwise direction, as required, to maintain the read head in its proper position to read the edge of the workpiece.

CROSS-REFERENCE TO RELATED APPLICATION

This invention is related to copending U.S. application Ser. No. 605,067, entitled, Automatic Cornely Embroidery System, filed on Dec. 27, 1966, in the name of Willard A. Ramsey and Charles E. Bolding. This copending application is assigned to the assignee of the subject invention and describes a Cornely-type sewing machine apparatus including a hand crank for permitting the direction of feeding to be changed in response to the direction in which the hand crank is turned by means of a highly skilled operator who is able to produce various decorative embroidery designs at will. For example, any abstract figure including writing can be produced by the machine depending upon the artistic skill of the operator. Connected to the hand crank is an angular transducer which is adapted to produce an electrical signal in the form of a pulsed output in accordance with the direction and amount of rotation resulting from the operator sewing a predetermined design. The pulsed output from the transducer is coupled to an electronic logic circuit which generates control signals which may be simultaneously fed to a tape recorder and an electrical step motor which drives a workpiece orientation and feed means. The design which has been simultaneosuly recorded on a tape recorder can be reproduced in a playback mode whereby the information pertaining to the recorded design is fed back through the logic circuit and then to the step motor for exactly reproducing the design previously recorded while obviating the need for the skilled operator.

BACKGROUND OF THE INVENTION

The purpose of the subject invention is to provide a means whereby a Cornely-type of sewing or embroidery machine is provided with the capability of sensing and following the edge of a workpiece without external control. For example, an applique in any arbitrary shape or position can be located on a piece of cloth and the apparatus forming the subject invention will automatically stitch around the edge of same. One type of self-programming means for conventional sewing machines is shown in U.S. copending application Ser. No. 590,669, entitled Electronic Control System for a Self-Programming Sewing Machine Apparatus, now U.S. Patent No. 3,385,245, filed in the name of Williard A. Ramsey and Jerry M. Minchey, which copending application is also assigned to the assignee of the subject invention. The said copending application describes means whereby a plurality of photoelectric sensing devices are positioned in a fixed configuration around the sewing head, with a light source being directed toward the photoelectric elements through one or more layers of cloth or other workpiece. Depending upon the combination of the light falling on each photosensitive element, a predetermined logic is generated by means of a logic circuit which will then move a work frame carrying the workpiece in an X and/or Y direction to position the sewing head along the edge of the cloth.

SUMMARY OF THE INVENTION

Briefly, the subject invention comprises a self-programming system for an embroidery sewing machine having a workpiece orientation feed guide means which is adapted to be moved in step fashion in response to the clockwise or counterclockwise rotation of an electrical step motor. A read head including a single photoelectric sensing element is mounted concentrically of the sewing needle and includes means for being coupled to said feed guide means so as to rotate about the needle as the feed means changes the orientation of the workpiece. A light source is adapted to be placed between the sensing element and the workpiece and the amount of light received by the light sensor is sensed and control signals generated in response thereto which are fed to the step motor for moving the orientation and feed means in the proper direction to position the sensing element along the edge of the workpiece or a dark line drawn thereon. This operation continuously causes the sewing machine to automatically stitch along the edge or line of the workpiece. Also, when desirable, the control signals can be coupled to a tape recorder for providing a recorded program of the path described by the feed means.

BRIEF DESCRIPTION OF THE DRAWINGS

FIGURE 1 is a front elevational view, partly in cross-section, of a Cornely-type sewing machine adapted to operate in accordance with the present invention including the electrical control circuitry therefor shown in block diagrammatic form;

FIGURE 2 is a partial cross-sectional view of the workpiece orientation and feed means and read head;

FIGURE 4 is a schematic diagram of a pulse signal generator utilized by the subject invention and illustrated in block diagram form in FIGURE 1 as a voltage to pulse rate converter;

FIGURE 5 is a schematic diagram of additional electrical circuitry forming part of the invention.

DESCRIPTION OF THE PREFERRED EMBODIMENT

Figure 3:
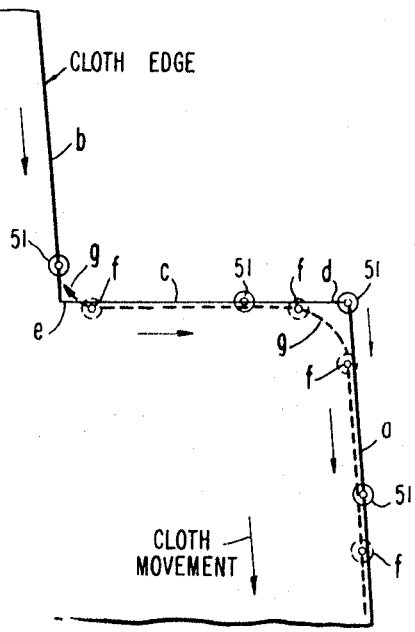
FIGURE 3 is a diagrammatic view showing the feeding of a workpiece having exterior and interior corners and showing how the reading eye follows the edge of the cloth workpiece always in leading relation to the needle.

Referring to the drawings in detail and more particularly to FIGURE 1, there is shown a Cornely-type sewing machine 10 which per se is conventional and is shown and described in U.S. Patent 3,139,051 to Story. The machine 10 has a base 12 over which the cloth is fed, a vertical standard 14, an arm 16 and a head 16' carrying a projecting bracket 20. A cloth orientation and feed means 18 is shown schematically in FIGURES 1 and 2 may be identical in construction and operation to the orientation and feed means in the Story patent. Very briefly, the feed means 18 includes an annular feed or presser foot 23 carried at the lower end of an arm 25 in surrounding concentric relationship to the reciprocating needle bar 21 of the embroidery or sewing machine. The presser foot 23 and arm 25 thus correspond exactly to the elements 80 and 72 of the Story patent and operate in conjunction with the needle in exactly the manner described in said patent. For a proper understanding of the present invention, it is not necessary to illustrate and describe in detail the construction and operation of the cloth feeding means, particularly in view of the Story patent whose disclosure is incorporated herein by reference.

Continuing to refer primarily to FIGURE 1, a rotary shaft or spindle 27 having an upper reduced portion 52 corresponds to the rotary shaft 122 of Story turned by gear 130 in that patent. In FIGURE 1, the shaft portion 52 carries a drive gear 52' fixed thereon corresponding to the gear 130 of Story. As in the Story patent, the rotation of gear 52 with spindle 27 establishes the direction of feed of the cloth over the base 12 as produced by the continuous stepping action of the annular presser foot or feed foot 23. This stepping action takes place in exactly the manner described for operating the feed foot 80 in the Story patent. The mechanical elements and connections for the feeding means shown particularly in FIGURES 3, 4 and 5 of Story are omitted from the present drawings for simplification and a purely schematic connection or coupling of the arm 25 carrying the feed foot 23 with the spindle 27 is indicated by the elements 29 and 59 in FIGURES 1 and 2, it being understood that the actual mechanism in detail is as disclosed in the Story patent.

Essentially, therefore, in the present invention, the embroidery machine of the Story patent is utilized, but instead of turning the gear 130 in Story by the manual crank means 156 to establish the direction of feed of the cloth, the corresponding gear 52' in the invention is turned by the step motor 46 and associated control circuitry shown in block diagram form in FIGURE 1, which components are in the nature of an attachment to a Cornely-type machine, as exemplified by Story.

A read head 31, FIGURES 1 and 2, is mounted concentrically with the reciprocating needle bar 21 and is attached to the spindle 27 so that it rotates with the spindle and annular feed foot 23 around the needle. Beneath the feed foot 23, FIGURE 1, is a transparent portion 33 of base 12, which houses a toroidal light source 35 therein. This feature will be more fully considered subsequently.

Continuing to refer to FIGURE 1, a hand crank 22 is located beneath the base 12 and is adapted to engage a machine clutch 24 when pulled downwardly manually. This downward motion raises push rod 26, the tilting pivot arm 28, and the pull rod 30. The pivot arm 28 is located on the pivot element 32 which is attached to the underside of the table 12. The hand crank 22 is mechanically coupled to a shaft 36 by means of the crank arm 34 so that any rotation of the hand crank 22 is transmitted to the shaft 36. The shaft 36 is mechanically coupled to an angular transducer 38. The hand crank operation is fully described with respect to the aforementioned copending application S.N. 605,067, entitled Automatic Cornely Embroidery System. Also coupled to the pivot arm 28 is a clutch solenoid 64 which, when energized, will engage the clutch 24 by moving the lever arm 28 downwardly. A starting switch 39 couples a +DC voltage from a source, not shown, to the clutch solenoid 64 which when closed places the sewing apparatus 10 into operation without the requirement of pulling down on the hand crank 22.

Mounted on the bracket 20 is an electrical step motor 46 which is adapted to be energized by a step motor controller 44. The step motor controller 44 causes the shaft 50 of the step motor 46 to rotate either in a clockwise or counterclockwise motion in a stepped movement. The shaft 50 is connected to a gear train 48 which is coupled not only to the feed spindle 27 by the gear 52' but also to the bobbin 58 by means of the rods 54 and mitre gears 56 substantially exactly as shown in the Story patent. Any rotation of the shaft 50 actuates the spindle 27 and also the bobbin 58. A logic circuit 40 is coupled to the voltage to pulse rate converter circuit 41 through the switch $S_2$ and receives two inputs therefrom identified as CW and CCW. The voltage to pulse rate converter receives an input from the read head 31 attached to the workpiece feed means 18. The output of the logic circuit is coupled to the step motor controller 44 and the record section 66 of the recorder 42. This will be explained in greater detail subsequently.

The read head 31, which is mounted concentrically of and rotates about the needle bar 21, is adapted to read the edge of a workpiece, not shown, which may be for example an applique or a dark line made on a piece of cloth. The read head is responsive to the amount of light received by a photosensitive element such as a photocell 51 mounted on the read head and adapted to be illuminated from the toroidal light source 35. As the amount of light received by the photocell 51 varies due to its position relative to the workpiece edge or line, its resistance changes. This resistance change is sensed by a circuit (FIGURE 4) which couples a signal indicative of the change to the voltage to pulse rate converter 41. The voltage to pulse rate converter, moreover, is responsive to the polarity of the signal received from the circuit to provide either a CW or a CCW output which is fed to the logic circuit 40. The logic circuit 40, in turn, produces a pulsed output signal which is fed to the step motor controller 44 and, when desirable, to the record section 66 of the recorder 42. The drive signal fed to the step motor 46 from the step motor controller 44 causes the step motor shaft 50 to rotate a predetermined amount in either a clockwise (CW) or counterclockwise (CCW) direction. The shaft 50, in turn, will drive the feed guide spindle 27 which in turn activates the presser foot 23 to position the workpiece. The radial motion of the feed spindle 27, corresponding to the direction of feed, is also translated to the read head 31. A closed loop servo system is thus provided whereby the output of the read head 31, which is a function of the light received and consequently the orientation of the workpiece, is used to generate control pulses for the step motor so that the needle bar 21 and read head 31 will automatically follow the edge of the workpiece or a heavy line drawn thereon without any external control.

Considering the present invention now in greater detail, reference to FIGURE 2 more fully illustrates the workpiece orientation and feed means 18 and the read head 31 mounted concentrically of the sewing head 21. The read head 31 is mechanically secured to the spindle 27 concentric to the needle, not shown, in the sewing head 21. The read head 31 includes a photocell 51 which is located in an extension arm 53. The photocell 51 is electrically coupled to two slip ring contacts 55 and 57 thereby providing an electrical output for the photosensitive element 51 as the feed guide spindle 27 rotates. This output is coupled to the voltage to pulse rate converter 41. As the spindle 27 turns, the motion is transmitted to the presser foot arm and to the feed foot 23 for moving the workpiece in a predetermined direction. The toroidal light source 35 is coupled to a DC source, not shown, by means of contacts 61 and 63, and light is directed through the feed foot 23 towards the photocell 51. It is evident that by properly directing the motions of the feed foot 23 in accordance with the amount of light sensed by the photosensitive element 51, the direction of feed can be automatically controlled so that the needle is maintained over the edge of the workpiece or line thereon.

Figure 6:
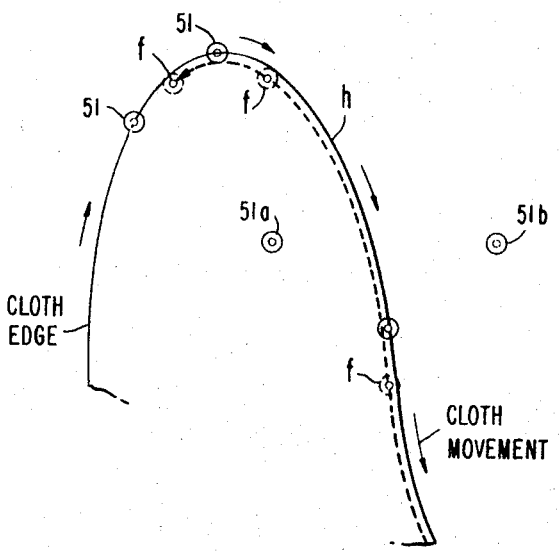
FIGURE 6 is a diagrammatic view showing the relative movements of the reading eye and the edge of the cloth workpiece and showing the ability of the eye to move onto the edge of the workpiece and follow it.

FIGURES 3 and 6 are helpful in understanding how the needle carried by needle bar 21 tracks or follows the edge of a piece of cloth and also how the photosensitive element 51 or eye will always tend to center itself on the cloth edge.

In FIGURE 3, the cloth has an edge portion including generally parallel straight sections a and b, a connecting transverse edge portion c, and what may be termed exterior and interior corners d and e. This is only one illustration and the edge configuration of the cloth will vary widely and will include irregular curved portions, rounded corner portions and the like. The feeding of the cloth relative to the eye 51 and machine needle f along the various edge portions is indicated by arrows in FIGURE 3. Also shown at several stations in FIGURE 3 is the spaced relationship of the eye 51 and needle on a somewhat exaggerated scale. In practice, the needle and eye should be arranged physically as close together as possible. FIGURE 3 also shows that the eye 51 always leads the needle along the cloth edge at any point and that the cloth is always being fed by the means 18 toward the eye and then toward the needle in that sequence. Consequently, the needle f will faithfully track or follow any straight line or curved edge portions behind the eye 51 and will also follow the eye at exterior or interior corners, such as the corners d and e. However, at these corners, due to the spacing of the eye 51 necessarily from the needle axis, as the eye 51 follows the exact contour of the sharp corner, the needle f will follow on a somewhat diagonal path g, as indicated at the corners d and e in FIGURE 3. The more nearly the eye is located to the needle axis, the shorter will be the diagonal path g. Again, in FIGURE 3, the condition has been exaggerated to more clearly illustrate the operation. In actual practice, the inability of the needle to follow the eye exactly at corners can be compensated for readily in the designing of garments, etc. without sharp corners and this particular limitation of the apparatus is of little practical consequence but should be understood.

FIGURE 6 shows a curved cloth edge h and also shows the needle f following the eye 51 at various points along this edge as the cloth is being fed by the means 18 in the directions as shown by the arrows. To this extent, FIGURES 3 and 6 are alike in showing how the eye 51 leads the needle with respect to the edge of the cloth being fed. Additionally, FIGURE 6 illustrates the ability of the photosensitive eye 51 to move onto the edge h or straddle the edge as where the eye might initially be located at a point spaced from the edge, on either side thereof, as at 51a or 51b. If the eye is initially at the point 51a above the cloth, the cloth will block the light from the light source 35 and in seeking light, the eye will move toward the edge h. On the other hand, if the eye is at 51b beyond the cloth piece, it will see all light from the source 35 and will therefore tend to move toward the cloth edge h. In either event, the eye will seek a balanced position directly on the cloth edge as indicated at 51 in FIGURE 6. The reason for the ability of the eye to seek out and follow the cloth edge is the following. The electrical output of the eye 51 is a function of the amount of light impinging on it. In all cases, the output of the eye causes logic circuit 40 to drive step motor 46 to in turn move the eye 51 either clockwise or counterclockwise around the axis of the needle, thus shifting the eye toward the edge of the cloth.

As noted above, the output of the photocell or photosensitive element 51 is coupled to the voltage to pulse rate converter circuit 41 shown in FIGURE 1. This circuit is shown schematically in FIGURE 4. Referring now to FIGURE 4, the photocell 51 comprises one leg of a bridge circuit including the variable resistor 67 and the two fixed resistors 69 and 71 such that slip ring contact 55 is connected to resistor 67 while slip ring contact 57 is connected to resistor 71. The common connection between slip ring contact 57 and the resistor 71 is returned to a point of reference potential illustrated as ground. The opposite slip ring contact 55 which is common to the variable resistor 67 is connected to one DC supply voltage terminal 73 which is adapted to be connected to the positive terminal of a 12 volt DC supply source, not shown. The opposite terminal 75 which is adapted to be connected to negative terminal of the 12 volt source is coupled to the common connection between resistors 71 and 69. The output of the bridge circuit is taken between terminal 80 and ground. Connected to terminal 80 is a resistor 81 which is coupled to bases of transistors 77 and 79 by means of resistors 83 and 85, repectively. The transistors 77 and 79 are complementary transistors, i.e., one is a PNP transistor while the other is an NPN transistor. The collectors of the transistors 77 and 79 are respectively coupled to the terminals 73 and 75 by means of their respective collector load resistors 87 and 89. The emitters of transistors 77 and 79 are commonly coupled together at terminal 97. Their respective bases are biased from the collector circuit. Specifically, the base of transistor 77 is biased by means of resistors 91 and 93 coupled in series to the base from the collector. Similarly, the base of transistor 79 is biased by means of resistor 95.

In operation, the bridge circuit, comprising the photosensitive element 51 and the resistors 67, 69 and 71, is energized by means of the 12 volt DC potential applied across terminals 73 and 75. By adjustment of the variable resistor 67, the bridge can be balanced for a predetermined amount of light falling on the photocell 51 such that zero voltage relative to ground appears at terminal 80. Any variation in the resistance of the photosensitive element which is caused by varying said predetermined amount of light directed thereto will be reflected in an unbalanced condition of the bridge circuit. For example, if the resistance of the photocell 51 decreases, the bridge output at terminal 80 will be positive with respect to ground whereas if the resistance increases, it will be negative. A positive voltage at resistor 81 will increase conduction of transistor 77 while decreasing the conduction of transistor 79. Since the emitters of transistors 77 and 79 are connected together at terminal 97, this terminal will go positive; on the other hand, a negative voltage appearing at resistor 81 will have the opposite effect causing transistor 77 to decrease in conduction while increasing the conduction of transistor 79 and terminal 97 will therefore go negative.

Terminal 97 is commonly coupled to the bases of transistors 99 and 101 by means of the circuit lead 103 and resistors 105 and 107, respectively. When terminal 97 is positive with respect to ground potential, it is desirable to obtain a pulsed output which, when coupled to the logic circuit 40 as shown in FIGURE 1, will cause the step motor 46 to step in a clockwise (CW) direction to bring the photocell back to a position where the bridge circuit will again be balanced. On the other hand, when terminal 97 goes negative, it is desirable that a counterclockwise (CCW) stepping of the step motor occur. To this end, the transistors 99 and 101 and circuits 109 are utilized. The transistor 99 operates as a conventional common emitter transistor amplifier circuit in that a 180° phase shift takes place between the base and collector electrodes. Transistor 99 is a PNP transistor and is biased from −20 volts DC so that it is normally in a conducting state. Transistor 101, however, is a conventional PNP emitter follower and the output will be in phase with the input. A phase reversal, therefore, takes place in transistor 99 whereas no phase reversal occurs in transistor 101. Accordingly, when the voltage at terminal 97 goes positive, transistor 99 will be made less conductive, causing the collector to go negative. Meanwhile, the emitter follower is also responsive to the positive voltage at terminal 97 and it will cause the emitter to go positive.

Coupled to the collector of transistor 99 and the emitter of transistor 101 are two identical pulse generators 109. These pulse generators are comprised of transistors 111, 113 and 114 which are coupled together as a feedback amplifier with the input to the base of transistor 111 being applied from the variable resistor 117. The feedback is provided by means of capacitor 119, the resistor 121 and the diode 123. The capacitor 119 and resistor 121 are connected in series from the emitter of transistor 115 to ground with the diode 123 being coupled from the common junction of resistor-capacitor back to the base of transistor 111. Coupled to the emitter electrode of transistor 115 is a unijunction oscillator circuit comprising unijunction transistor 125. The negative voltage appearing at the collector of transistor 99 when terminal 97 goes positive will drive the base of transistor 111 so as to render it non-conductive, causing its collector to become more positive. This is applied through transistors 113 and 115 causing the unijunction oscillator to provide an output pulse having a freqency dependent upon the magnitude of the positive voltage at the emitter of transistor 115. The network comprising diode 123, resistor 121 and capacitor 119 provides stability for the frequency control voltage of the unijunction oscillator. A pulsed output, therefore, appears at the base $B_2$. This pulsed output is coupled to transistor 127 which acts as a buffer amplifier and appears at terminal 129. The pulsed output appearing at terminal 129 will be termed the "CCW output" and is fed to the logic circuit 40 through switch $S_2$ as shown in FIGURE 1. Therefore, when a positive voltage exists at terminal 97, a pulsed output is obtained from the CCW channel at terminal 129 with the frequency of the pulsed signal being proportional to the magnitude of the voltage.

Considering transistor 101, however, it should be noted that the positive voltage appearing at terminal 97 has no effect on transistor 101 because it is a PNP transistor and requires a negative base voltage applied thereto for rendering it conductive. Hence, no output would occur from the CW channel output appearing at terminal 131; however, in a case where terminal 97 goes negative, transistor 101 will be rendered conductive and a negative voltage will be applied to transistor 111 causing a pulsed output to appear at terminal 131. A negative voltage appearing at the base of transistor 99, however, will cause the pulse generator circuit 109 coupled thereto to become inoperative and no pulsed output will appear from the CCW channel at terminal 129.

The voltage appearing at terminal 97 will cause a pulse to appear either at the CCW terminal 129 or the CW terminal 131 depending upon its polarity. If terminal 97 goes positive, a pulsed output will appear at the CCW 129, whereas if terminal 97 goes negative, a pulsed output will occur at the CW output terminal 131. A bridge circuit balance condition, i.e., zero voltage at terminal 97, is made to exist when the photocell 51 detects the edge of the workpiece by the amount of light directed thereto from the light source 35. When the photocell 51 senses no workpiece at all, more light will be directed thereto and the bridge will become unbalanced in one direction. On the other hand, if the photocell is completely over the fabric, the bridge circuit will become unbalanced in the other direction.

Referring now to FIGURE 5, the CW output from the self-programming apparatus, such as terminal 131 shown in FIGURE 4, is coupled through one section of a two pole, two position switch $S_2$ to the logic circuit 40 and to a monostable multivibrator 108 by means of one section of another two pole, two position switch $S_1$. The CCW output from the self-programming apparatus is connected through the other section of the switches $S_2$ and $S_1$ to a second monostable multivibrator 118. Whenever a pulsed output appears at terminals 131 and 129, respectively, of the voltage to pulse rate converter, the multivibrators 108 and 118 generate a 50 microsecond negative squarewave pulse for each pulse received. The negative output pulse from multivibrator 108 is taken from the collector of transistor 112 and fed to a buffer amplifier comprising transistor 114A, which is an emitter follower. The pulsed output is taken from the emitter of transistor 114A and applied to circuit lead 116. Monostable multivibrator 118 pulses are applied to the buffer amplifier 114B with the output thereof occurring at the emitter circuit. These appear on circuit lead 120. The circuit lead 116 coupled to the emitter of the buffer amplifier comprising transistor 114A is coupled to the CW input terminal of the motor controller 44 while the circuit lead 120 coupled to the emitter of transistor 114B is coupled to the CCW of motor controller 44.

In order to prevent transient signals from stepping the step motor 46, transistors 140 and 142 are coupled to the CCW and CW inputs of the motor controller 44 and are biased in an "on" condition by means of the −20 volts DC applied to terminal 143 providing a relatively low impedance across the respective inputs, thereby rendering the motor circuit inoperative. Upon energization of the solenoid 64 by means of closing the switch 39, however, the solenoid will close switch $S_3$ and return the bases of transistors 140 and 142 to ground, rendering them nonconductive. A relatively high impedance approaching open circuit condition appears allowing pulses appearing on circuit lead 116 or 120 to be coupled to the motor controller 44 inputs. Further protective circuitry for step motor 46 is provided by transistors 148 and 150 which are coupled thereto through a relay $K_1$. When the relay $K_1$ is activated, for example when the ON-OFF power switch, not shown, is thrown, 28 volts is applied to the series combination of resistor 152 and capacitor 154. When the voltage on the capacitor 154 reaches a predetermined level after a time delay determined by the RC time constant of the resistor-capacitor combination, transistor 148 will become conductive. Transistor 150 is connected into the ground return of the motor controller 44 and is rendered conductive when transistor 148 turns on. A time delay is therefore provided for the motor controller 44 circuit for preventing any other switching transients from stepping the step motor 46.

When desirable, the pulses for stepping the step motor 46 appearing at leads 116 and 120 can be coupled to the input terminals 137 and 141 of the recorder 42 whereby the pulses can be recorded on a permanent record, for example a magnetic tape. In addition, the recorded information contained on the recorder 42 can be played back to energize step motor 46 to reproduce the previously-recorded program merely by switching $S_2$ shown in FIGURE 4 to the opposite position. The second position of $S_2$ may be referred to as the playback mode and it is within the spirit and scope of the present invention that one or more Cornely-type embroidery machines can be controlled by means of a prerecorded program of the type described by the present invention. Any number of embroidery machines can be automatically controlled by the taped program without the need for human operator control.

In summation, therefore, the read head 31 includes a photosensitive element 51 which is attached to the workpiece orientation and feed means and is adapted to rotate concentrically around the needle as the feed means moves to position the workpiece relative to the needle. By feeding the output of the photosensitive element to the voltage to pulse rate converter as shown in FIGURE 4, stepping pulses are generated in the logic circuit 40 as shown in FIGURE 4 and coupled to the motor controller 44 for stepping the step motor in a predetermined direction to effect bridge balance, at which time the edge of the workpiece or a dark line drawn thereon will be positioned under the needle. When the sewing machine is placed into operation, the workpiece orientation and feed means 18 will be automatically turned in a step-by-step fashion by means of the step motor 46 to maintain the photosensitive element 51 on the edge of the workpiece and thereby effecting bridge balance.

What has been shown and described, therefore, is a Cornely-type embroidery machine which includes self-programming means for automatically sensing and following the edge of an applique in any arbitrary shape or position and automatically stitching around the edge of same. Secondly, it is possible to reproduce a recorded figure in the absence of a skilled operator by recording the motion of the subject invention as it automatically senses and follows an outline of a drawing or an appliqué.

We claim:

1. A self-determining workpiece orientation and feed system for sewing machines and the like comprising a sewing machine including workpiece orientation and feed means and a sewing needle, workpiece detector means located proximately to said needle and being coupled to said orientation and feed means and adapted to be moved in conjunction therewith, said detector means providing an electrical output signal in response to the position of said workpiece relative to said sewing needle, electrical circuit means coupled to said detector means and being responsive to said electrical output signal for generating a control signal, and electrical motor means connected to said workpiece orientation and feed means including circuit means for electrical coupling to said electrical circuit means, said electrical motor means being responsive to said control signal to move said orientation and feed means and said detector means.

2. A self-determining workpiece orientation and feed system for sewing machines comprising in combination: an embroidery sewing machine having workpiece orientation and feed means and a sewing needle, workpiece position detector means located adjacent said sewing needle and attached to said orientation and feed means and adapted to be moved rotatively about said sewing needle in conjunction with movement of said workpiece orientation and feed means, said detector means providing an output signal in response to the presence of said workpiece relative to said sewing needle, electrical circuit means coupled to said detector means and being responsive to said electrical output signal for generating at least one control signal, electrical step motor means mechanically coupled to said workpiece orientation and feed means and including circuit means for electrical connection to said electrical circuit means and being responsive to said at least one control signal to actuate said orientation and feed means and said detector means.

3. A self-determining workpiece orientation and feed system for embroidery type sewing machines comprising in combination: an embroidery sewing machine having a sewing needle and a workpiece orientation and feed means concentrically located with respect to the sewing needle, workpiece detector means integral with said orientation and feed means and including a workpiece sensor located in relatively close proximity to said sewing needle to detect the position of a workpiece relative to the sewing needle, circuit means coupled to said sensor for generating an electrical signal in response to said relative positions of said workpiece and said sewing needle, and motor means coupled to said orientation and feed means and said circuit means and being responsive to said electrical signal to actuate said orientation and feed means.

4. The apparatus as defined in claim 3 wherein said sensor comprises a photosensitive element and additionally including a light source selectively located with respect to said sewing needle and said photosensitive element whereby said workpiece is adapted to intersect light energy directed toward said sensor from said light source.

5. The apparatus as defined in claim 3 where said motor means comprises an electrical step motor responsive to said electrical signal to actuate said orientation and feed means in a step-by-step movement.

6. The apparatus as defined in claim 5 and additionally including motor controller means coupled to said step motor including means for being coupled to said circuit means whereby said motor controller is responsive to said electrical signal for driving said step motor in either a clockwise or a counterclockwise direction in response to said electrical signal.

7. The apparatus as defined in claim 3 wherein said sensor comprises a photocell and wherin said circuit means comprises an electrical bridge circuit coupled to said photocell being responsive thereto to provide a first polarity output signal and a second polarity output signal, pulse generator means coupled to said bridge circuit means for providing a first pulsed output signal in response to said first polarity signal and a second pulsed output signal in response to said second polarity signal; and logic circuit means coupled to said pulse generator being responsive to said first and said second pulsed output signal for providing a first control signal to said motor means for rendering said motor means operable in a clockwise direction and responsive to said second pulsed output signal for providing a second control signal to said motor means for rendering said motor means operable in a counterclockwise direction.

8. The appartus as defined in claim 3 wherein said workpiece orientation and feed means comprises a feed spindle coupled to said motor means and being concentrically located with respect to said sewing needle, feed foot means, and means coupling said feed foot means to said feed spindle for positioning said workpiece in said predetermined position.

9. The apparatus as defined in claim 3 wherein said sensor comprises a photocell located adjacent said sewing needle and adapted to rotate about the central axis of said sewing needle and providing an electrical output in accordance with the location of said workpiece relative to the sewing needle.

10. The apparatus as defined by claim 3 wherein said circuit means comprises a bridge circuit, and wherein said sensor comprises a photosensitive element including means for coupling said photosensitive element in one leg of said bridge circuit, and additionally including circuit means for providing a substantially zero output signal in response to a bridge circuit balance condition, a first polarity signal in response to a first unbalanced condition of said bridge circuit and a second polarity signal for a second unbalanced condition of said bridge circuit.

References Cited

UNITED STATES PATENTS

| | | | |
|---|---|---|---|
| 2,261,644 | 11/1941 | Cockrell | 250—202 XR |
| 3,080,836 | 3/1963 | Clemens et al. | |
| 3,124,692 | 3/1964 | Brouwer | 250—202 |
| 3,224,393 | 12/1965 | Adams et al. | |
| 3,329,109 | 7/1967 | Portnoff et al. | |
| 3,072,081 | 1/1963 | Milligan et al. | |
| 3,139,051 | 6/1964 | Story | 112—102 XR |

JAMES R. BOLER, Primary Examiner

U.S. Cl. X.R.

112—102; 250—202